US 8,798,025 B2

(12) United States Patent
Colavolpe et al.

(10) Patent No.: US 8,798,025 B2
(45) Date of Patent: Aug. 5, 2014

(54) REDUCED COMPLEXITY FDM-CPM DETECTOR WITH MULTIPLE ACCESS INTERFERENCE CANCELLATION

(75) Inventors: Giulio Colavolpe, Parma (IT); Amina Piemontese, Monte Sant'Angelo (IT)

(73) Assignee: Newtec CY NV, Sint-Niklaas (BE)

( * ) Notice: Subject to any disclaimer, the term of this patent is extended or adjusted under 35 U.S.C. 154(b) by 241 days.

(21) Appl. No.: 13/380,540

(22) PCT Filed: Jun. 28, 2010

(86) PCT No.: PCT/EP2010/059144
§ 371 (c)(1),
(2), (4) Date: Dec. 23, 2011

(87) PCT Pub. No.: WO2010/149791
PCT Pub. Date: Dec. 29, 2010

(65) Prior Publication Data
US 2012/0098612 A1    Apr. 26, 2012

(30) Foreign Application Priority Data
Jun. 26, 2009   (GB) .................................. 0911124.6

(51) Int. Cl.
*H04B 1/00*        (2006.01)
*H04B 1/7115*      (2011.01)
*H04B 1/7107*      (2011.01)
*H04B 1/707*       (2011.01)

(52) U.S. Cl.
CPC .......... *H04B 1/7115* (2013.01); *H04B 1/71072* (2013.01); *H04B 1/707* (2013.01)
USPC ............ 370/343; 370/342; 370/335; 370/329

(58) Field of Classification Search
CPC ............. H04B 1/7115; H04B 1/71072; H04B 2201/70701; H04B 1/707; H04B 1/7093; H04B 1/7117; H04B 2201/70707; H04B 7/0857

USPC ................ 370/343, 342, 335, 329, 441, 209; 375/144, 148, 348, 346, 136
See application file for complete search history.

(56) References Cited

U.S. PATENT DOCUMENTS 7,920,517 B2 *   4/2011   Bachl et al. ................... 370/329
8,068,535 B2 *  11/2011   Cairns et al. .................. 375/148
(Continued)

FOREIGN PATENT DOCUMENTS

WO          2007025335          3/2007

OTHER PUBLICATIONS

Barbieri et al. "Noval Graph-Based Algorithms for Interference Cancellation in CDMA Systems" (Jun. 21, 2009) pp. 712-716.*

(Continued)

*Primary Examiner* — Dang Ton
*Assistant Examiner* — Sai Aung
(74) *Attorney, Agent, or Firm* — Bacon & Thomas, PLLC

(57) ABSTRACT

An FDM-CPM multi-user detector (30) jointly detects the received symbols for all users by determining from the received multi-user signal an a-posteriori probability mass function (pmf) of a time-sequence of states and transmitted symbols of all users, by iterative message passing corresponding to a specific factorisation of the pmf. The factorisation involves a combined variable representing possible transmitted symbols and CPM states of each user for each symbol time interval, so as to make the iterative process convergent. Non exponential complexity is enabled by disregarding multiple access interference (MAI) from at least some of the other users. Applications can include hubs for satellite communication ground stations.

21 Claims, 3 Drawing Sheets

(56) References Cited

U.S. PATENT DOCUMENTS

| | | | |
|---|---|---|---|
| 8,385,470 B2* | 2/2013 | Gossett et al. | 375/316 |
| 8,406,695 B2* | 3/2013 | Hou et al. | 455/63.1 |
| 8,422,955 B2* | 4/2013 | Smee et al. | 455/63.1 |
| 8,451,963 B2* | 5/2013 | Li et al. | 375/346 |
| 8,472,877 B2* | 6/2013 | Hou et al. | 455/63.1 |
| 2006/0062283 A1* | 3/2006 | Zhang et al. | 375/147 |

OTHER PUBLICATIONS

Barbieri et al. "Spectrally-Efficient Continuous Phase Modulations" (Mar. 1, 2009) vol. 8. pp. 1564-1572.*

Mazmanishvili A.S., Photocount Distribution from the Coherent Signal Recorded by a Detector with Variable Efficiency Against the Background of Noise, 2000IEE, AN 6776164, Jan. 2000.

Gamal et al., Iterative Multiuser Detection for Coded CDMA Signals in AWGN and Fading Channels, IEEE Journal, vol. 18, No. 1, Jan. 2000.

Wang et al., Iterative(Turbo) Soft Interference Cancellation and Decoding for Coded CDMA, IEEE Transactions on Communications, vol. 47, No. 7, Jul. 1999.

Boutros et al., Iterative Multiuser Joint Decoding: Unified Framework and Asymptotic Analysis, IEEE Transactions of Information Theory, vol. 48, No. 7, Jul. 2002.

Boutros et al., Iterative Multiuser Joint Decoding: Unified Framework and Asymptotic Analysis, ISIT2001, Washington, D.C. Jun. 24-29, 2001.

Barbieri et al., Novel Graph-Based Algorithms for Interference Cancellation in CDMA Systems, IEEE, 2009, pp. 712-716.

Bokolamulla et al., Iterative Decoding of Serially Concatenated CPM in Fading Channels with Noisy Channel State Information, IEEE Transactions on Communications, vol. 57, No. 4, Apr. 2009, pp. 1079-1086.

Sykora et al., Performance Evaluation of the Factor Graph CPM Phase Discriminator Decoder with Canonical Messages and Modulo Mean Updates, IEEE, Oct. 2008, pp. 1-5.

Barbieri et al., Spectrally-Efficient Continuous Phase Modulations, IEEE Transactions on Wireless Communications, vol. 8, No. 3, Mar. 2009, pp. 1564-1572.

International Search Report in PCT/EP2010/059144, Nov. 29, 2010.
Written Opinion of ISA in PCT/EP2010/059144, Nov. 29, 2010.
IPRP in PCT/EP2010/059144, Sep. 8, 2011.
British IP Office Search Report for GB 0911124.6, Oct. 7, 2009.

* cited by examiner

US 8,798,025 B2

REDUCED COMPLEXITY FDM-CPM DETECTOR WITH MULTIPLE ACCESS INTERFERENCE CANCELLATION

FIELD OF THE INVENTION

This invention relates to apparatus and methods for multiuser detection of FDM-CPM signals, and to corresponding programs or corresponding methods of producing configurations for processors for carrying out such methods.

BACKGROUND OF THE INVENTION

In frequency division multiplexed (PDM) Continuous Phase Modulation (CPM) multiple access systems, the spectral efficiency can be increased by reducing the spacing between adjacent channels, thus allowing some overlap in frequency and hence admitting a certain amount of interference. When a multiuser receiver is adopted, the benefits in terms of spectral efficiency can be very large (the signals can be packed denser and denser see refs [2], [4]).

Unfortunately, the complexity of the optimal multi-user detector varies exponentially with the number of users, and specifically for the case of CPM the implementation on to state-of-the art digital hardware platforms is not realistic (the required amount of computations per second translates to extremely high power consumption and very costly design even for tens of users).

SUMMARY OF THE INVENTION

An object of the invention is to provide alternative to apparatus and methods for multiuser detection of FDM-CPM signals, and corresponding programs or corresponding methods of producing configurations for processors for carrying out such methods.

According to a first aspect, the invention provides:

An FDM-CPM multi-user detector having a computational complexity that is related non exponentially to a number of users, the detector being arranged to jointly detect the received symbols for all users by determining from the received multi-user signal an a-posteriori probability mass function (pmf) of a time-sequence of states and transmitted symbols of all users, by carrying out an iterative message passing process corresponding to a specific factorisation of the pmf, the factorisation involving a combined variable representing possible transmitted symbols and CPM states of each user for each symbol time interval, so as to make the iterative process convergent, the iterative process having non exponential complexity with respect to the number of users by making an approximation by disregarding multiple access interference (MAI) from at least some of the other users.

By disregarding interference from at least some of the other users, the complexity of calculation is no longer exponentially related to the number of users and so becomes more practical to implement. By using the specified combined variable as set out above, the iterative process can be made convergent. How it becomes more convergent is apparent by considering the factor graph as explained in more detail below.

The factor graph shows that the specified combined variable introduces cycles in the factor graph which are long enough to ensure convergence. In brief, a longer cycle tends to break unwanted correlations in the iterative message passing process, as is known in the literature.

As a result of the reduced complexity, the detector has a feasible hardware counterpart (in terms of power consumption, and receiver cost) Moreover, the detector can be implemented to have a relatively low degradation of the packet error rate (PER) vs signal to noise ratio (SNR) performance degradation w.r.t. the optimal detector. This means there is a relatively good trade off between complexity and performance.

Embodiments of the invention can have any other features added, some such additional features are set out in dependent claims and described in more detail below.

Other aspects of the invention include corresponding methods, and computer programs for execution on conventional computing hardware to carry out such methods, and methods of producing such computer programs by factorization of a pmf. The present invention also relates to a computer program product for performing, when executed on a processing means, a method for factorization of a pmf.

Furthermore, a machine-readable data storage device storing the computer program product as described above and transmission of such a computer program product Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION OF EMBODIMENTS

Figure 1:
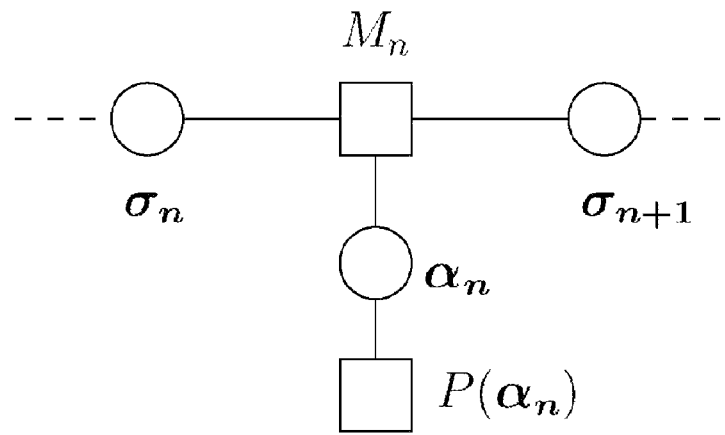
FIGS. 1 to 3 show examples of factor graphs, FIG. 1 relating to an optimal detector, FIG. 2 relating to a detector with the factorisation but before the approximation, and FIG. 3 relating to an embodiment having the factorization and an example of the approximation.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention. References to a signal can encompass any kind of signal in any medium, and so can encompass an electrical or optical or wireless signal or other signal for example. References to a processor can encompass any means for processing signals or data in any form and so can encompass for example a personal computer, a microprocessor, analog circuitry, application specific integrated circuits, field programmable gate arrays, software for the same, and so on.

In the description provided herein, numerous specific details are set forth. However, it is understood that embodiments of the invention may be practiced without these specific details. In other instances, well-known methods, structures and techniques have not been shown in detail in order not to obscure an understanding of this description.

Introduction to the Embodiments:

Embodiments of the present invention provide a frequency division multiplexed (FDM) satellite system and method wherein each user employs a continuous phase modulation (CPM), serially concatenated with an outer code through an interleaver, and iterative detection/decoding. In such a system or method, the spectral efficiency can be increased by reducing the spacing between two adjacent channels, thus increasing the relevant interference. The present invention provides low complexity suboptimal multiuser detectors able to effectively cope with such an interference. Embodiments of the present invention extend multiuser detection algorithms proposed for code division multiple access (CDMA) systems, especially a detection scheme using the framework based on factor graphs (FGs) and the sumproduct algorithm (SPA). The simulation results show that the described algorithms allow to effectively reduce the spacing, thus increasing the spectral efficiency, and in particular, the proposed detection scheme results to be the most effective one in terms of performance and computational complexity.

As described in more detail below, a detector is based on a novel factorisation of the detector probability mass function (pmf) and some non-trivial manipulations plus approximations on the corresponding factor graph, FG. This eventually leads to a sub-optimal non-cycle-free factor graph with a complexity that is linear in the number of users. As a result, the message passing scheme has a feasible hardware counterpart (in terms of power consumption, cost and so on). Moreover, the introduced suboptimality can result in an acceptable packet error rate (PER) vs signal to noise ratio (SNR) performance degradation with respect to the optimal detector, such that the bandwidth efficiency increase of an FDM-CPM system with frequency overlap or other compromise technique is still warranted.

Some notable features of the factor graphs derived in more detail below are summarized here.

First it is noted that: In a generic symbol interval [nT, (n+1)T) the CPM signal of user "u" is completely defined by the symbol "alpha_n(u)" and state "sigma_n(u)" which encompasses both phase state and correlative state. References to alpha and sigma are intended to mean the same as the corresponding Greek symbols used in the appendix.

Figure 2:
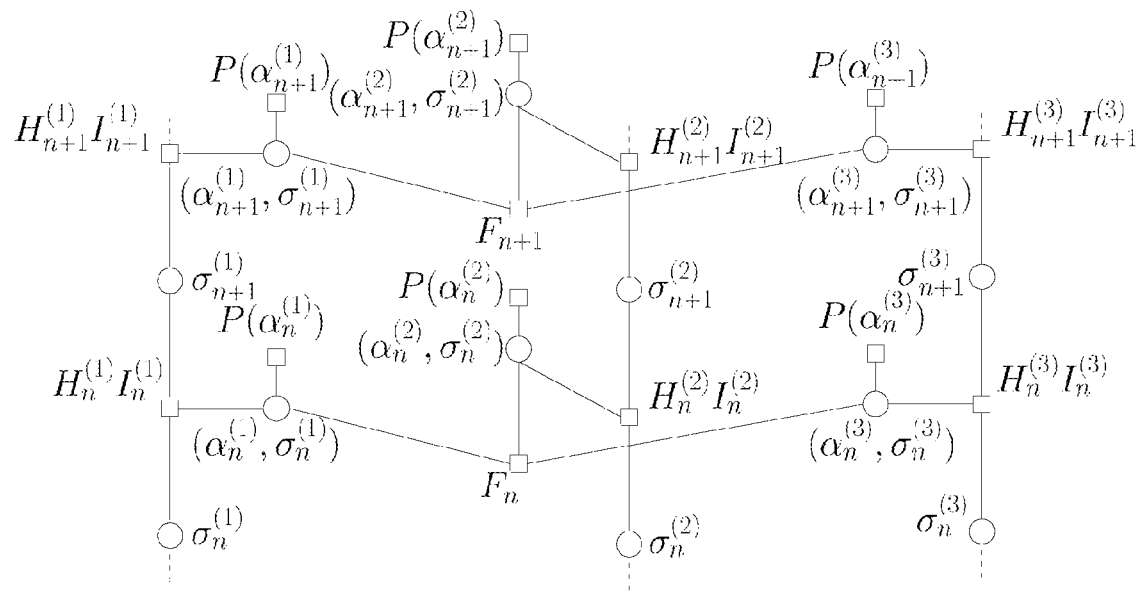
Figure 3:
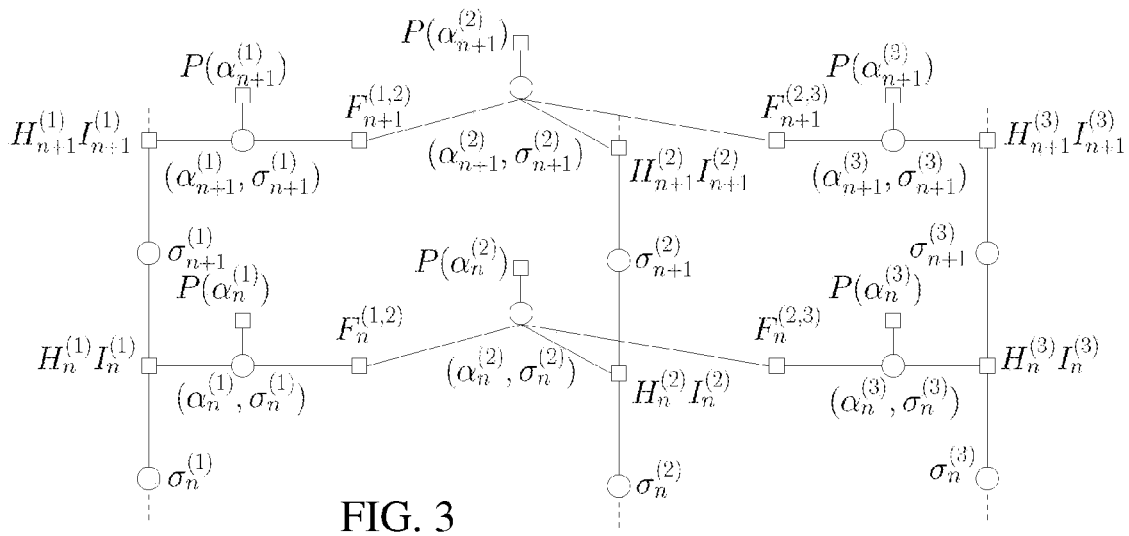

Also note that:
in the cycle-free, optimal factorisation of the optimal multiuser detector for a given time nT, the state of all users is clustered in a global FG variable node "sigma_n" and the symbols transmitted by all users are clustered in another global FG variable node "alpha_n"
the novel factorisation detailed in the appendix has
variable nodes that cluster (also referred to as "stretching") the variables into a combined variable ("alpha_n(u)", "sigma_n(u)") (as shown in the appendix in FIG. 2 and the reference to "stretching the variables" in deriving equation 15.)
variable nodes, equal to "sigma_n(u)" (for example see the three bottom nodes in FIG. 2 or FIG. 3 in the appendix)
function nodes F_n which represent the interference between the users. (To achieve the non exponential complexity, the function node F_n is not connected to all the users, which is an example of the approximation referred to above. As shown in FIG. 3 it is only connected to two of the three users in this example.)
This means the interference between at least some of the users is neglected, which is acceptable at least for non frequency adjacent users).

function nodes which combine transmitter state transition constraints (aka Trellis description) (see nodes labeled $H_n^{(i)} I_n^{(i)}$ in FIG. 2 or 3 in the appendix) and branch metrics (likelihood of individual transitions)

function nodes that represent the a-priori probability of a transmitted symbol "alpha_n(u)" (see square nodes at the top of FIG. 2 or 3)

the resulting factor graph (FG) has cycles of length 12 (shown if FIG. 2 or FIG. 3 by counting the number of edges in a shortest path to return to a given starting point).

These cycles prove to be long enough to break correlations and thus to ensure proper convergence of an iterative message passing scheme (determined by numerical simulation for example).

A symbol detection scheme employed in a digital receiver can be graphically described by making use of the Factor Graph (FG) formalism. See for example a standard work on Factor Graphs in the context of Iterative Receiver Design: Iterative Receiver Design, Henk Wymeersch, Cambridge University Press. The multi-user detection scheme which is optimum from a Packet Error Rate (PER) versus Signal to Noise Ratio (SNR) point of view can be represented as a cycle-free Factor Graph (FG). It is well known how messages must be passed in a given cycle-free Factor Graph. A given message passing algorithm maps directly to a Digital Signal Processing hardware implementation, and the complexity/feasibility thereof.

Comparison with prior art: Soft Interference Cancellation from the CDMA literature shows complexity reduction is obtained by approximating the multiple access interference as extra Additive Gaussian Noise. For "U" users, this leads to a factor graph consisting of "U" single user detectors with increased complexity per detector, i.e. no cross-links between the sub-graphs that represent the single user detectors, much in contrast with the FG described in the above and accordance with the present invention.

This completely different approach also has linear complexity. However, applied to FDM-CPM, it results in worse PER vs SNR performance loss w.r.t. the optimal detector than the approach presented in the appendix.

Detailed Description of FIGS. 1 to 3

FIGS. 1-3 show examples of factor graphs. FIG. 1 relates to an optimal detector, FIG. 2 relates to a detector with the factorisation but before the approximation, and FIG. 3 relates to an embodiment having the factorisation and the approximation.

In frequency division multiplexed (FDM) systems, the spectral efficiency can be increased by reducing the spacing between two adjacent channels, thus allowing overlap in frequency and hence admitting a certain amount of interference. A significant improvement can be obtained through packing even when at the receiver side a single-user receiver is employed. The terms single-channel and multi-channel can be more suitable than single-user and multiuser. However, the terms "users" and "channels" will be interchangeably in the following. When a multiuser receiver is adopted, the benefits in terms of spectral efficiency can be even larger and the signals can be packed denser and denser. Since, as known, the complexity of the optimal multiuser detector increases exponentially with the number of channels, suboptimal detection schemes are required. In the case of a satellite FDM system using linear modulations, the adoption of reduced-complexity multiuser detection algorithms using code division multiple access (CDMA) shows that these techniques work well also in this scenario. The present invention provides extensions of these multiuser techniques to the case of CPM signals, since they are often employed in satellite communications for their robustness to non-linearities, stemming from the constant envelope, their claimed power and spectral efficiency, and their recursive nature which allows to employ them in serially concatenated schemes.

The literature on multiuser detection for FDM-CPM systems is very poor and essentially focuses on binary schemes, such as Gaussian minimum shift keying (GMSK). The theoretical limits of a multiuser communication system using serially concatenated CPMs (SCCPMs) over an additive white Gaussian noise (AWGN) channel have been investigated previously. Reduced complexity detection techniques are not considered, but most of the methods proposed for CDMA could be applied to multiuser SCCPM schemes. Optimal as well as reduced-complexity multiuser detection techniques based on soft interference cancellation (SIC) for CDMA schemes can be derived using factor graphs (FGs) and the sum-product algorithm (SPA) [11]. Below is described the system model, and the optimal as well as suboptimal reduced-complexity multiuser detection schemes are extended to this scenario based on an FG/SPA framework and an embodiment of the present invention is obtained by means of some graphical manipulations on the FG representing the joint a posteriori probability mass function (pmf) of the transmitted symbols, rather than assuming the Gaussianity of the interference.

It is assumed that the channel is shared by U independent users. Without loss of generality, synchronous users are considered, all employing the same modulation format, and an AWGN channel. In other words, a typical downlink of a satellite system is considered although the present invention includes the extension to the case of asynchronous users, using also different CPM formats, which is straightforward. It is assume that each user transmits N symbols and $\alpha_n^{(u)}$ denotes the symbol transmitted by user u at the discrete-time n, which takes on values in the M-ary alphabet $\{\pm 1, \pm 3 \ldots \pm(M-1)\}$. Moreover, $\alpha^{(u)} = (\alpha_0^{(u)}, \ldots, \alpha_{N-1}^{(u)})^T$ is the vector of the N symbols transmitted by user u and $\alpha_n = (\alpha_n^{(u)}, \ldots, \alpha_n^{(u)})^T$ and $\alpha = (\alpha_0^T, \ldots, \alpha_{N-1}^T)^T$. In the following, $(\bullet)^T$ denotes transpose, $(\bullet)^H$ transpose conjugate, and $(\bullet)^*$ complex conjugate. The complex envelope of the received signal can be written as:

$$r(t) = \sum_{u=1}^{U} s(t, \alpha^{(u)}) \exp\{j2\pi f^{(u)} t\} + w(t)$$

where w(t) is a zero-mean circularly symmetric white Gaussian process with power spectral density $2N_0$ ($N_0$ is assumed perfectly known at the receiver), $f^{(u)}$ is the difference between the carrier frequency of user u and the frequency assumed as reference for the computation of the complex envelope, and $s(t, \alpha^{(u)})$ is the CPM information-bearing signal of user u which reads:

$$s(t, \alpha^{(u)}) = \sqrt{\frac{2E_S^{(u)}}{T}} \exp\left\{j2\pi h \sum_{n=0}^{N-1} \alpha_n^{(u)} q(t - nT)\right\}. \quad (1)$$

In equation (1), $E_S^{(u)}$ is the energy per information symbol of user u, T the symbol interval, q(t) the phase-smoothing response, and h=r/p the modulation index (r and p are relatively prime integers). The derivative of the function q(t) is the so-called frequency pulse of length L symbols. In the generic time interval [nT, nT+T], the CPM signal of user u is completely defined by symbol $\alpha^{(u)}_n$ and state $\sigma^{(u)}_n = (\omega^{(u)}_n, \phi^{(u)}_n)$ where $$\omega^{(u)}_n = (\alpha^{(u)}_{n-1}, \alpha^{(u)}_{n-2}, \ldots, \alpha^{(u)}_{n-L+1}) \quad (5)$$

is the correlative state and $\phi^{(u)}_n$ is the phase state which can be recursively defined by equation 2 and takes on p values. In the following, we define $\sigma_n = (\sigma^{(1)}_n, \ldots, \sigma^{(U)}_n)^T$ and $\sigma^T_0, \ldots, \sigma^T_N)^T$:

$$\phi^{(u)}_n = (\phi^{(u)}_{n-1} + \pi h \alpha^{(u)}_{n-L}) \bmod 2\pi \quad (2)$$

A possible way of extracting a sufficient statistic from the received signal r(t) is by means of the technique described in [13]. It is assumed that the useful signal component in r(t) is band-limited (although this is not necessarily strictly true in the case of CPM signals, whose spectrum has an infinite support) with bandwidth lower than $\eta/2T$, where $\eta$ is a proper integer. The signal r(t) is prefiltered by means of an analog low-pass filter which leaves unmodified the useful signal and has a vestigial symmetry around $\eta/2T$ [13]. As shown in reference [13], a sufficient statistic can be obtained by extracting $\eta$ samples per symbol interval from the signal after the analog prefilter and, in addition, the condition on the vestigial symmetry of the analog prefilter ensures that the noise samples are independent and identically distributed complex Gaussian random variables with mean zero and variance $2N_0\eta/T \cdot r_{n,m}$ denotes the m-th received sample (m=0, 1, ..., $\eta$–1) of the n-th symbol interval. It can be expressed as:

$$r_{n,m} = \sum_{u=1}^{U} s^{(u)}_{n,m}(\alpha^{(u)}_n, \sigma^{(u)}_n) + w_{n,m} \quad (3)$$

where, as mentioned, $\{w_{n,m}\}$ are independent and identically distributed complex Gaussian noise samples and $s(u)_{n,m}(\alpha^{(u)}, \sigma^{(u)}$ (whose dependence on $\alpha^{(u)}$ and $\sigma^{(u)}$ will optionally be omitted in the following) is the contribution of user u to the useful signal component. In the following, $r_n$ is defined as $=(r_{n,0}, r_{n,1}, \ldots, r_{n,\eta-1})^T$, $r=(r^T_0, r^T_1, \ldots, r^T_{N-1})^T$ and $s^{(u)}_n = (s^{(u)}_{n,0}, s^{(u)}_{n,1}, \ldots, s^{(u)}_{n,\eta-1})^T$.

Several soft-input soft-output (SISO) multiuser detection algorithms for PDM-CPM systems are now derived.

A. Optimal Multiuser Detector

From (3) and assuming that symbols of user u are independent, the pmf $P(\alpha, \sigma|r)$ factorizes as:

$$P(\alpha, \sigma|r) \propto p(r|\alpha, \sigma) P(\sigma|\alpha) P(\alpha) \quad (4)$$

where $$P(\alpha) = \prod_{n=0}^{N-1} P(\alpha_n) \quad (5)$$

$$P(\sigma|\alpha) = P(\sigma_0) \prod_{n=0}^{N-1} P(\sigma_{n+1}|\sigma_n, \alpha_n) \quad (5)$$

$$p(r|\alpha, \sigma) \propto \prod_{n=0}^{N-1} \exp\left\{-\frac{1}{2N_0}\left\|r_n - \sum_{u=1}^{U} s^{(u)}_n\right\|^2\right\}. \quad (6)$$

Notice that $P(\sigma_{n+1}|\sigma_n, \alpha_n)$ is an indicator function, equal to one if $\alpha_n$, $\sigma_n$, and $\sigma_{n+1}$ satisfy the constraints of the trellises of each user and to zero otherwise. Defining $$M_n(\alpha_n, \sigma_n, \sigma_{n+1}) = P(\sigma_{n+1}|\sigma_n, \alpha_n) \cdot \exp\left\{-\frac{1}{2N_0}\left\|r_n - \sum_{u=1}^{U} s^{(u)}_n\right\|^2\right\}$$

we now have $$P(\alpha, \sigma|r) \propto P(\sigma_0) \prod_{n=0}^{N-1} M_n(\alpha_n, \sigma_n, \sigma_{n+1}) P(\alpha_n) \quad (7)$$

whose corresponding FG is shown in FIG. 1. The SPA applied to this cycle-free FG takes the form of the well known SCR algorithm [14] and provides the exact a posteriori probabilities $P(\alpha^{(u)}_n|r)$. The complexity of this optimal multiuser detector is exponential in the number of users.

B. Sic Algorithms from the CDMA Literature

The most efficient reduced-complexity SIC algorithm from the CDMA literature is that proposed in [9], [10] and see [12] for its derivation by means of the FG/SPA to framework. It is based on a Gaussian approximation for the multiple access interference (MAI). In other words, the algorithm can be obtained by replacing the pmf of the interfering symbols with a complex circularly symmetric Gaussian probability density function (pdf) with the same mean and variance. As an example, a SISO detector for each user will be employed and these detectors will exchange soft information that will be used to cancel the interference. In order to generalize the algorithm to the considered scenario, it is assume that the equivalent channel for user i is $$r^{(i)}_{n,m} = s^{(i)}_{n,m} + z^{(i)}_{n,m}$$

where $z^{(i)}_n,m$ is the sum of interference and noise, given by $$z^{(i)}_{n,m} = w_{n,m} + \sum_{u=1, u\neq i}^{U} s^{(u)}_{n,m}.$$

The vector $z^{(i)}_n = (z^{(i)}_{n,0}, z^{(i)}_{n,1}, \ldots, z^{(i)}_{n,\eta-1})^T$, assumed to be Gaussian, has mean $\mu^{(i)}_n$ and covariance matrix $\Phi^{(i)}_n$ given by $$\mu^{(i)}_n = \sum_{u=1, u\neq i}^{U} \sum_{(\alpha^{(u)}_n, \sigma^{(u)}_n)} \hat{P}(\alpha^{(u)}_n, \sigma^{(u)}_n|r) s^{(u)}_n \quad (8)$$

$$\Phi^{(i)}_n = \sum_{u=1, u\neq i}^{U} \sum_{(\alpha^{(u)}_n, \sigma^{(u)}_n)} \hat{P}(\alpha^{(u)}_n, \sigma^{(u)}_n|r) s^{(u)}_n s^{(u)H}_n - \mu^{(i)}_n \mu^{(i)H}_n + \frac{2N_0\eta}{T} I \quad (9)$$

where I is the identity matrix and $\hat{P}(\alpha^{(u)}_n, \sigma^{(u)}_n|r)$ are the estimate of a posteriori probabilities provided by the SISO detector related to the interfering user u. The SISO detector for user i, in the form of a RCA algorithm, will employ the following branch metrics $$G^{(i)}(\alpha^{(i)}_n, \sigma^{(i)}_n) \propto$$

$$\propto \exp\{-(r_n - s^{(i)}_n - \mu^{(i)}_n)^H \Phi^{(i)-1}_n (r_n - s^{(i)}_n - \mu^{(i)}_n)\}$$

$$\propto \exp\{-2Re[s^{(i)H}_n \Phi^{(i)-1}_n (r_n - \mu^{(i)}_n)]\} \cdot \exp\{-s^{(i)H}_n \Phi^{(i)-1}_n s^{(i)}_n\} \quad (10)$$

and will provide to the detectors for the other users the following estimates of the a posteriori probabilities $$\hat{P}(\alpha_n^{(i)}, \sigma_n^{(i)}|r) \propto A_n(\sigma_n^{(i)}) B_{n+1}(\sigma_{n+1}^{(i)}) \cdot$$
$$G^{(i)}(\alpha_n^{(i)}, \sigma_n^{(i)}) I_n^{(i)}(\alpha_n^{(i)}, \sigma_n^{(i)}, \sigma_{n+1}^{(i)}) P(\alpha_n^{(i)}) \quad (11)$$

having denoted by $A_n(\sigma_n^{(i)})$ and $B_n(\sigma_n^{(i)})$ the forward and backward messages of the BUR algorithm, respectively, and by $I_n^{(i)}(\alpha_n^{(i)}, \sigma_n^{(i)}, \sigma_{n+1}^{(i)}) = P(\sigma_{n+1}^{(i)}|\sigma_n^{(i)}, \alpha_n^{(i)})$ an indicator function equal to one if $\alpha_n^{(i)}$, $\sigma_n^{(i)}$, and $\sigma_{n+1}^{(i)}$, satisfy the trellis constraint and to zero otherwise This suboptimal multiuser detector is then composed of U single-user detectors whose complexity is increased, with respect to the case when the interference is neglected, by the need to compute, for each symbol interval, $\mu_n^{(i)}$ and $\Phi_n^{(i)}$, through (8) and (9), to perform the inversion of $\Phi_n^{(i)}$, and to finally compute the quadratic form in (10). In the following, this algorithm will be referred to as SIC 1.

The algorithm can be simplified by neglecting the off-diagonal elements of $\Phi_n^{(i)}$ [9]. In this way, the inversion results to be computationally less intensive at the price of a to performance degradation. This simplified detector will be referred to as SIC 2.

C. An Embodiment of the Algorithm

By using the FG/SPA framework, an algorithm is derived which is an embodiment of the present invention without resorting to a Gaussian approximation of the MAI. This algorithm has a better performance in this scenario where, in practice, the main contribution of the interference affecting a given user, is related to the two adjacent channels only and, hence, the central limit theorem cannot be advocated as in CDMA.

This embodiment results from a different factorization of the pmf $P(\alpha, \sigma|r)$. In (4), (5) and (6) can be further factorized as:

$$P(\alpha) = \prod_{u=1}^{U} \prod_{n=0}^{N-1} P(\alpha_n^{(u)})$$

$$P(\sigma|\alpha) = \prod_{u=1}^{U} P(\sigma_0^{(u)}) \prod_{n=0}^{N-1} P(\sigma_{n+1}^{(u)}|\sigma_n^{(u)}, \alpha_n^{(u)})$$

$$= \prod_{u=1}^{U} P(\sigma_0^{(u)}) \prod_{n=0}^{N-1} I_n^{(u)}(\alpha_n^{(u)}, \sigma_n^{(u)}, \sigma_{n+1}^{(u)})$$

$$p(r|\alpha, \sigma) \propto \prod_{n=0}^{N-1} F_n(\alpha_n, \sigma_n) \prod_{u=1}^{U} H_n^{(u)}(\alpha_n^{(u)}, \sigma_n^{(u)})$$

where $$H_n^{(u)}(\alpha_n^{(u)}, \sigma_n^{(u)}) = \exp\left\{\frac{1}{N_0}\text{Re}[r_n^H s_n^{(u)}]\right\} \quad (12)$$

$$F_n(\alpha_n, \sigma_n) = \prod_{i=1}^{U-1} \prod_{j=i+1}^{U} \exp\left\{-\frac{1}{N_0}\text{Re}[s_n^{(i)H} s_n^{(j)}]\right\} \quad (13)$$

having discarding the terms independent of symbols and states and taken into account that a CPM signal has constant envelope. Hence, we finally have $$P(\alpha, \sigma|r) \propto P(\sigma_0^{(u)}) \quad (14)$$

$$\prod_{n=0}^{N-1} F_n(\alpha_n, \sigma_n) \prod_{u=1}^{U} H_n^{(u)}(\alpha_n^{(u)}, \sigma_n^{(u)}) \cdot I_n^{(u)}(\alpha_n^{(u)}, \sigma_n^{(u)}, \sigma_{n+1}^{(u)}) P(\alpha_n^{(u)}).$$

The resulting graph has cycles of length four, that make unlikely the convergence of the SPA, since they are too short. These short cycles in the original graph can be removed by stretching the variables am, in $\sigma_n^{(u)}$ in $(\alpha_n^{(u)}, \sigma_n^{(u)})$. The FG corresponding to this operation has shortest cycles of length twelve and is depicted in FIG. 2 in the case of a system with three users. Obviously the SPA applied to this graph is iterative and leads to an approximate marginalization. A further simplification can be introduced by assuming that the interference among non adjacent users is negligible. In other words, (13) is approximated as:

$$F_n(\alpha_n, \sigma_n) \simeq \prod_{i=1}^{U-1} F_n^{(i,i+1)}(\alpha_n^{(i)}, \sigma_n^{(i)}, \alpha_n^{(i+1)}, \sigma_n^{(i+1)}) \quad (15)$$

where $$F_n^{(i,i+1)}(\alpha_n^{(i)}, \sigma_n^{(i)}, \alpha_n^{(i+1)}, \sigma_n^{(i+1)}) = \exp\left\{-\frac{1}{N_0}\text{Re}[s_n^{(i)H} s_n^{(i+1)}]\right\}. \quad (16)$$

The corresponding FG is shown in FIG. 3. All the simulation results refer to the adoption of this approximation.

Consider the FG in FIG. 3. If the factor nodes $F^{(i,i+1)}$, are removed, the U single-user detectors are obtained which neglect the interference. Hence, these nodes are in charge of the interference mitigation. The increase in complexity due to their presence can be easily understood if their role is considered when the SPA is applied. Consider user i and the fact that the messages from node $(\alpha_n^{(i-1)}, \sigma_n^{(i-1)})$ to node $F_n^{(i-1,i)}$ and from node $(\alpha_n^{(i+1)}, \sigma_n^{(i+1)})$ to node $F_n^{(i,i+1)}$ have the meaning of estimates (approximations) of the a posteriori probabilities $P(\alpha_n^{(i-1)}, \sigma_n^{(i-1)}|r)$ and $P(\alpha_n^{(i+1)}, \sigma_n^{(i+1)}|r)$. Hence, the detector for user i will employ as branch metric $$H_n^{(i)} I_n^{(i)} P(\alpha_n^{(i)}) \sum_{(\alpha_n^{(i-1)}, \sigma_n^{(i-1)})} \hat{P}(\alpha_n^{(i-1)}, \sigma_n^{(i-1)}|r) \quad (17)$$

$$F_n^{(i-1,i)} \sum_{(\alpha_n^{(i+1)}, \sigma_n^{(i+1)})} \hat{P}(\alpha_n^{(i+1)}, \sigma_n^{(i+1)}|r) F_n^{(i,i+1)}.$$

The number of terms to be summed for each interfering user, which is related to the computational complexity, is identical to that necessary to obtain $\mu_n^{(i)}$ or $\Phi_n^{(i)}$, through (8) or (9).

Figure 4:
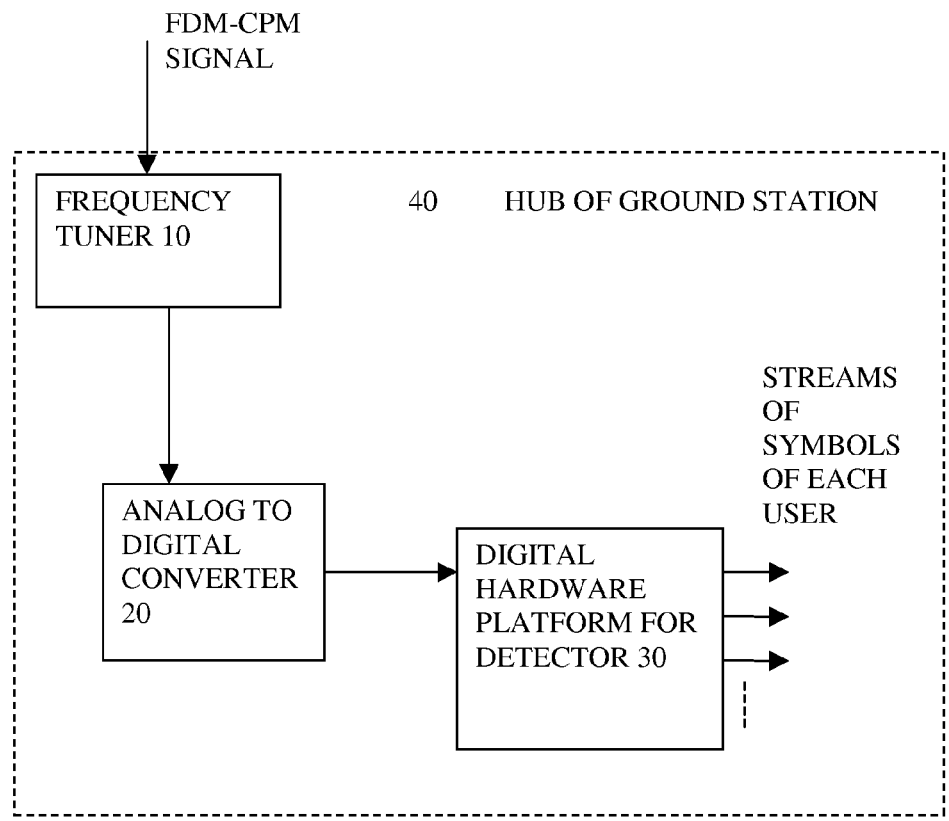
FIG. 4 shows a detector according to an embodiment.

FIG. 4, an Embodiment of the Invention and Shown at the End of the Appendix

FIG. 4 shows a schematic view of an FDM-CPM multi-user receiver. This can be for use as part of a hub 40 of a satellite communication system, as part of a groundstation of a downlink for example, or in other applications. The receiver has a frequency tuner (10) for receiving the wireless signal and outputting a signal at or near baseband. This can output the multi-user signal in complex form or otherwise, as would be apparent to those skilled in the art. The multi-user signal is sampled by an analog to digital converter (20) before being passed to the detector implemented in processing circuitry. The detector according to a first embodiment is implemented on a Digital Hardware Platform (30), typically consisting of one or multiple ASICs, FPGAs or DSPs (or a combination thereof). The message passing process to determine the pmfs and output the most likely symbols for each user, is mapped on these devices using conventional techniques to produce an appropriate configuration for the devices. Optionally the probabilities can also be output if needed. This configuration can take the form of programs for the DSP, or designs in the form of configuration files for the ASICs or FPGAs, or combinations of these as appropriate. A stream of the most likely symbols for each user can be output by the detector. This could be fed to further processing steps such as de-interleaving and outer decoding for example, carried out externally or by the same hardware.

Figure 5:
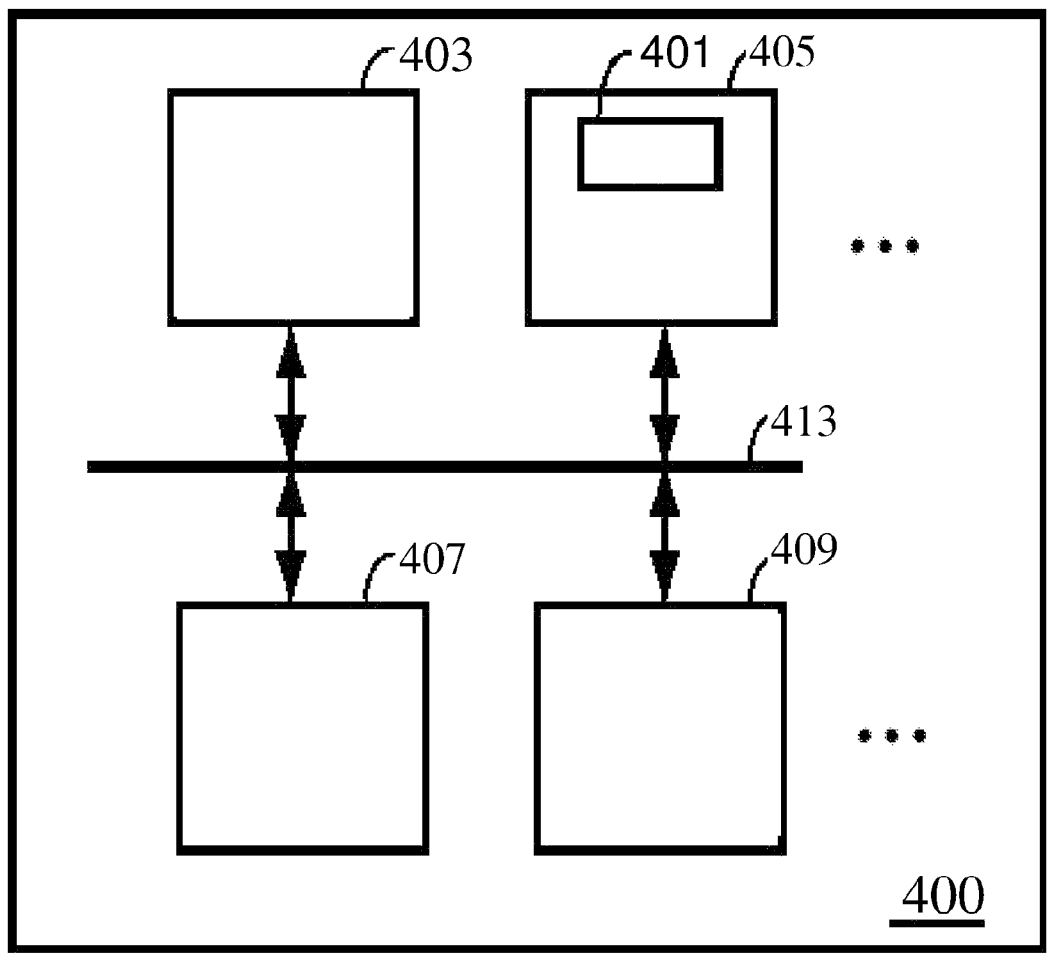
FIG. 5 is an illustration of a processing system and apparatus whereon a method according to any of the embodiments of the present invention can be implemented.

FIG. 5 Implementation

In a further aspect, the present invention relates to a system and apparatus for telecommunications processing according to any of the methods of the present invention. The different components of system may comprise processing power for performing their function. The functionality of the different components of the apparatus 300 or different method steps of the methods of the present invention may be implemented in separate or a joint processing apparatus 400 such as shown in FIG. 5. FIG. 5 shows one configuration of processing apparatus 400 that includes at least one programmable processor 403 coupled to a memory subsystem 405 that includes at least one form of memory, e.g., RAM, ROM, and so forth. It is to be noted that the processor 403 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system may include a storage subsystem 407 that has at least one disk drive and/or CD-ROM drive and/or DVD drive. In some implementations, a display system, a keyboard, and a pointing device may be included as part of a user interface subsystem 409 to provide for a user to manually input information. Ports for inputting and outputting data also may be included. More elements such as network connections, interfaces to various devices, and so forth, may be included, but are not illustrated in FIG. 5. The various elements of the processing system 400 may be coupled in various ways, including via a bus subsystem 413 shown in FIG. 5 for simplicity as a single bus, but will be understood to those in the art to include a system of at least one bus. The memory of the memory subsystem 405 may at some time hold part or all (in either case shown as 411) of a set of instructions that when executed on the processing system 400 implement the steps of the method embodiments described herein. Thus, while a processing system 400 such as shown in FIG. 5 is prior art, a system that includes the instructions to implement aspects of the methods for telecommunications processing is not prior art, and therefore FIG. 5 is not labelled as prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media, Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

The software may be adapted to carry out a method of jointly detecting symbols of multiple users in a received FDM-CPM signal with a computational complexity that is related non exponentially to a number of users. The software may be adapted to determine from the received multi-user signal an a-posteriori probability mass function (pmf) of a time-sequence of states and transmitted symbols of all users, by carrying out an iterative message passing process corresponding to a specific factorisation of the pmf, the factorisation involving a combined variable representing possible transmitted symbols and CPM states of each user for each symbol time interval, so as to make the iterative process convergent, the iterative message passing process having non exponential complexity with respect to the number of users by making an approximation by disregarding multiple access interference (MAT) from at least some of the other users.

The software may be used in a receiver. The software when run on a suitable processor may be adapted to provide a frequency tuner for receiving the wireless signal and outputting a signal at or near baseband. The software can be adapted to allow output of the multi-user signal in complex form or otherwise. The software may be adapted to sample the multi-user signal, i.e. to provide an analog to digital converter before passing the signal to a detector which may also be implemented in software running on the same or different processor. The software may be adapted to map the message passing process to determine the pmfs and output the most likely symbols for each user. Optionally the probabilities can also be output if needed. A stream of the most likely symbols for each user can be output by the detector. This could be fed to further processing steps such as de-interleaving and outer decoding for example, carried out by further software.

Other variations can be envisaged within the scope of the claims.

The following REFERENCES are each incorporated in their entirety and as specified in the above text:

[1] A. Barbieri, D. Fertonani, and G. Colavolpe, "Improving the spectral efficiency of linear modulations through time-frequency packing," in *Proc. IEEE International Symposium on Information Theory*, (Toronto, Canada), pp. 2742-2746, July 2008.

[2] A. Barbieri, D. Fertonani, and G. Colavolpe, "Time-frequency packing for linear modulations: Spectral efficiency and practical detection schemes," to appear in IEEE Trans. Commun., 2009.

[3] A. Barbieri, D. Fertonani, and G. Colavolpe, "Spectrally-efficient continuous phase modulations," in *Proc. IEEE International Symposium on Information Theory*, (Toronto, Canada), pp. 2747-2751, July 2008.

[4] A. Barbieri, D. Fertonani, and G. Colavolpe, "Spectrally-efficient continuous phase modulations," to appear in IEEE Trans. Wireless Commun., 2009.

[5] B. F. Beidas, H. El Gamal, and S. Kay, "Iterative interference cancellation for high spectral efficiency satellite communications," *IEEE Trans. Commun.*, vol. 50, pp. 31-36, January 2002.

[6] K. R. Narayanan and G. L. Stuber, "Performance of trellis-coded CPM with iterative demodulation and decoding," *IEEE Trans. Commun.*, vol. 49, pp. 676-687, April 2001.

[7] P. Moqvist and T. M. Aulin, "Serially concatenated continuous phase modulation with iterative decoding," *IEEE Trans. Commun.*, vol. 49, pp. 1901-1915, November 2001.

[8] P. Moqvist, *Multiuser Serially Concatenated Continuous Phase Modulation*. PhD thesis, Chalmers University of Technology, Goteborg, Sweden, 2002.

[9] X. Wang and H. V. Poor, "Iterative (turbo) soft interference cancellation and decoding for coded CDMA," *IEEE Trans. Commun.*, vol. 47, pp. 1046-1061, July 1999.

[10] H. El Gamal and E. Geraniotis, "Iterative multiuser detection for coded CDMA signals in AWGN and fading channels," *IEEE J. Select. Areas Commun.*, vol. 18, pp. 30-41, January 2000.

[11] F. R. Kschischang, B. J. Frey, and H.-A. Loeliger, "Factor graphs and the sum-product algorithm," *IEEE Trans. Inform. Theory*, vol. 47, pp. 498-519, February 2001.

[12] J. Boutros and G. Caire, "Iterative multiuser joint decoding: unified framework and asymptotic analysis," *IEEE Trans. Inform. Theory*, vol. 48, pp. 1772-1793, July 2002.

[13] H. Meyr, M. Oerder, and A. Polydoros, "On sampling rate, analog prefiltering, and sufficient statistics for digital receivers," *IEEE Trans. Commun.*, vol. 42, pp. 3208-3214, December 1994.

[14] L. R. Bahl, J. Cocke, P. Jelinek, and J. Raviv, "Optimal decoding of linear codes for minimizing symbol error rate," *IEEE Trans. Inform. Theory*, vol. 20, pp. 284-287, March 1974.

The invention claimed is:

1. A frequency division multiplexed, continuous phase modulation (FDM-CPM) multi-user detector comprising:
a processor for executing instructions stored in a memory, and the processor for operating a computational complexity that is related non exponentially to a number of users, the processor of the FDM-CPM multi-user detector being further configured to:
jointly detect symbols of multiple users in a received multi-user FDM-CPM signal; and
determine, from said received multi-user signal, marginal a-posteriori probability mass functions (pmf's) of a time-sequence of CPM states and transmitted symbols of all users,
wherein the a-posteriori pmf's of the transmitted symbols are determined by carrying out an iterative message passing process corresponding to a specific factorization of a joint a-posteriori pmf of the transmitted symbols and CPM states,
wherein the factorization involves a combined variable representing possible transmitted symbols and CPM states of each user for each symbol time interval, so as to make the iterative message passing process convergent, and
wherein the iterative message passing process attains non exponential complexity with respect to the number of users by making an approximation by disregarding multiple access interference (MAI) from at least some of the other users.

2. The detector of claim 1, wherein the specific factorization of the joint a posteriori pmf of the transmitted symbols and CPM states is:

$$H_n^{(u)}(\alpha_n^{(u)}, \sigma_n^{(u)}) = \exp\left\{\frac{1}{N_0} Re[r_n^H s_n^{(u)}]\right\}$$

$$F_n(\alpha_n, \sigma_n) = \prod_{i=1}^{U-1} \prod_{j=i+1}^{U} \exp\left\{-\frac{1}{N_0} Re[s_n^{(i)H} s_n^{(j)}]\right\}$$

$$P(\alpha, \sigma | r) \propto$$

$$P(\sigma_0^{(u)}) \prod_{n=0}^{N-1} F_n(\alpha_n, \sigma_n) \prod_{u=1}^{U} H_n^{(u)}(\alpha_n^{(u)}, \sigma_n^{(u)}) \cdot I_n^{(u)}(\alpha_n^{(u)}, \sigma_n^{(u)}, \sigma_{n+1}^{(u)}) P(\alpha_n^{(u)})$$

using the approximation $$F_n(\alpha_n, \sigma_n) \simeq \prod_{i=1}^{U-1} F_n^{(i,i+1)}(\alpha_n^{(i)}, \sigma_n^{(i)}, \alpha_n^{(i+1)}, \sigma_n^{(i+1)})$$

where $$F_n^{(i,i+1)}(\alpha_n^{(i)}, \sigma_n^{(i)}, \alpha_n^{(i+1)}, \sigma_n^{(i+1)}) = \exp\left\{-\frac{1}{N_0} Re[s_n^{(i)H} s_n^{(i+1)}]\right\},$$

wherein P is a probability mass function of a time-sequence of states and transmitted symbols of all users, u is a user, n is a discrete time instant, $N_0$ is a power spectral density of the complex noise,
$\alpha_n^{(u)}$ is the symbol transmitted by user u at the discrete time instant n, $\alpha_n = (\alpha^{(1)}_n, \ldots, \alpha^{(u)}_n)^T$ is a vector of the symbols transmitted by all users at the discrete time instant n, and $\alpha = (\alpha^T_0, \ldots, \alpha^T N)^T$,
$r^H_n$ is the Hermitian transpose of the vector of received samples in the n-th symbol interval and $r = (r^T_0, \ldots, r^T N)^T$, and
$Sn^{(u)}$ is a vector of the contribution of user u to the useful signal component in the n-th symbol interval.

3. The detector of claim 1 wherein the specific factorization comprises variable nodes that cluster or stretch the variables into a combined variable.

4. The detector of claim 1 wherein the specific factorization comprises:
a) variable nodes,
b) function nodes which represent the interference between the users;
c) function nodes which combine transmitter state transition constraints; and
d) function nodes that represent the a-priori probability of a transmitted symbol.

5. The detector of claim 1, wherein the combined variable introduces cycles in the factor graph which are long enough to ensure convergence.

6. The detector of claim 1, arranged to disregard all the other users other than adjacent frequency users.

7. The detector of claim 1, the detector comprising a network of processors, the message passing process being mapped onto the network of processors.

8. The detector of claim 1, the factorization also involving functions which combine transmitter state transition constraints and metrics relating to a likelihood of individual transitions.

9. A hub for a groundstation of a downlink of a satellite communication system, the hub comprising:
a receiver for receiving frequency division multiplexed, continuous phase modulation (FDM-CPM) signals originating from many users, the receiver having a FDM-CPM multi-user detector comprising:

a processor for executing instructions stored in a memory, and the processor for operating a computational complexity that is related non exponentially to a number of users, the processor of the FDM-CPM multi-user detector being configured to:

jointly detect symbols of multiple users in a received multi-user FDM-CPM signal; and determine, from said received multi-user signal, marginal a-posteriori probability mass functions (pmf's) of a time-sequence of CPM states and transmitted symbols of all users, wherein the marginal a-posteriori pmf's of the transmitted symbols are determined by carrying out an iterative message passing process corresponding to a specific factorization of a joint a-posteriori pmf of the transmitted symbols and CPM states, wherein the factorization involves a combined variable representing possible transmitted symbols and CPM states of each user for each symbol time interval, so as to make the iterative message passing process convergent, and wherein the iterative message passing process attains non exponential complexity with respect to the number of users by making an approximation by disregarding multiple access interference (MAI) from at least some of the other users.

10. A method of jointly detecting symbols of multiple users in a received frequency division multiplexed, continuous phase modulation (FDM-CPM) multi-user signal with a computational complexity that is related non exponentially to a number of users, comprising the steps of:

determining by a processor, from the received FDM-CPM multi-user signal, marginal a-posteriori probability mass functions (pmf's) of a time-sequence of CPM states and transmitted symbols of all users, and carrying out an iterative message passing process corresponding to a specific factorization of a joint a-posteriori pmf of the transmitted symbols and CPM states, wherein the factorization involves a combined variable representing possible transmitted symbols and CPM states of each user for each symbol time interval, so as to make the iterative message passing process convergent, wherein the iterative message passing process attains non-exponential complexity with respect to the number of users by making an approximation by disregarding multiple access interference (MAI) from at least some of the other users, and wherein the iterative message is transmitted for each user after making the approximation.

11. The method of claim 10 wherein the specific factorization of the joint a-posteriori pmf of the transmitted symbols and CPM states is:

$$H_n^{(u)}(\alpha_n^{(u)}, \sigma_n^{(u)}) = \exp\left\{\frac{1}{N_0}\text{Re}[r_n^H s_n^{(u)}]\right\}$$

$$F_n(\alpha_n, \sigma_n) = \prod_{i=1}^{U-1}\prod_{j=i+1}^{U} \exp\left\{-\frac{1}{N_0}\text{Re}[s_n^{(i)H} s_n^{(j)}]\right\}$$

$$P(\alpha, \sigma | r) \propto$$

$$P(\sigma_0^{(u)}) \prod_{n=0}^{N-1} F_n(\alpha_n, \sigma_n) \prod_{u=1}^{U} H_n^{(u)}(\alpha_n^{(u)}, \sigma_n^{(u)}) \cdot I_n^{(u)}(\alpha_n^{(u)}, \sigma_n^{(u)}, \sigma_{n+1}^{(u)}) P(\alpha_n^{(u)})$$

using the approximation $$F_n(\alpha_n, \sigma_n) \simeq \prod_{i=1}^{U-1} F_n^{(i,i+1)}(\alpha_n^{(i)}, \sigma_n^{(i)}, \alpha_n^{(i+1)}, \sigma_n^{(i+1)})$$

where $$F_n^{(i,i+1)}(\alpha_n^{(i)}, \sigma_n^{(i)}, \alpha_n^{(i+1)}, \sigma_n^{(i+1)}) = \exp\left\{-\frac{1}{N_0}\text{Re}[s_n^{(i)H} s_n^{(i+1)}]\right\},$$

wherein P is a probability mass function of a time-sequence of states and transmitted symbols of all users, u is a user, n is a discrete time instant, $N_0$ is the power spectral density of the complex noise, $\alpha_n^{(u)}$ is the symbol transmitted by user u at the discrete time instant n, $\alpha_n = (\alpha_n^{(1)}, \ldots, \alpha_n^{(u)})^T$ is a vector of the symbols transmitted by all users at the discrete time instant n, and $\alpha = (\alpha_0^T, \ldots, \alpha_N^T)^T$, $\sigma_n^{(u)}$ is a the state transmitted by user u at the discrete time instant n, $\sigma_n = (\sigma_n^{(1)}, \ldots, \sigma_n^{(U)})^T$ is a vector of the states transmitted by all users at the discrete time instant n and $\sigma = (\sigma_0^T, \ldots, \sigma_N^T)^T$, $r_n^H$ is the Hermitian transpose of the vector of received samples in the n-th symbol interval and $r = (r_0^T, \ldots, r_N^T)^T$, and $S_n^{(u)}$ is a vector of the contribution of user u to the useful signal component in the n-th symbol interval.

12. The method of claim 10, the disregarding of multiple access interference (MAI) from at least some of the other users comprising disregarding users other than adjacent frequency users.

13. The method of claim 10, the received FDM-CPM signal having frequency overlaps between adjacent users.

14. The method of claim 10, wherein the factorization also involves functions which combine transmitter state transition constraints and metrics relating to a likelihood of individual transitions.

15. A program stored on a non-transitory computer readable medium which when executed by a processor, causes the processor to carry out a method for jointly detecting symbols of multiple users in a received multi-user frequency division multiplexed, continuous phase modulation (FDM-CPM) signal with a computational complexity that is related non exponentially to a number of users, the method comprising the steps of:

Determining, from the received FDM-CPM multi-user signal, marginal a-posteriori probability mass functions (pmf's) of a time-sequence of CPM states and transmitted symbols of all users, and carrying out an iterative message passing process corresponding to a specific factorization of a joint a-posteriori pmf of the transmitted symbols and CPM states, wherein the factorisation involves a combined variable representing possible transmitted symbols and CPM states of each user for each symbol time interval, so as to make the iterative message passing process convergent, and wherein the iterative message passing process attains non-exponential complexity with respect to the number of users by making an approximation by disregarding multiple access interference (MAI) from at least some of the other users.

16. A method of producing a configuration for processors of an a frequency division multiplexed, continuous phase modulation (FDM-CPM) multi-user detector, the method comprising the steps of:

determining by a processor a message flow for iteratively from a received multi-user signal: marginal a-posteriori probability mass functions (pmf's) of a time-sequence of CPM states and transmitted symbols of all users, corresponding to a specific factorization of a joint a-posteriori pmf of the transmitted symbols and CPM states, and producing the configuration from the determined message flow, wherein the factorization involves a combined variable representing possible transmitted symbols and CPM states of each user for each symbol time interval, so as to make the iterative process convergent, wherein the message flow has non-exponential complexity with respect to the number of users by making an approximation by disregarding multiple access interference (MAI) from at least some of the other users, and wherein the iterative message is transmitted for each user after making the approximation.

17. The method of claim 16, wherein the specific factorization of the joint a-posteriori pmf of the transmitted symbols and CPM states is given by:

$$H_n^{(u)}(\alpha_n^{(u)}, \sigma_n^{(u)}) = \exp\left\{\frac{1}{N_0}\mathrm{Re}[r_n^H s_n^{(u)}]\right\}$$

$$F_n(\alpha_n, \sigma_n) = \prod_{i=1}^{U-1}\prod_{j=i+1}^{U} \exp\left\{-\frac{1}{N_0}\mathrm{Re}[s_n^{(i)H} s_n^{(j)}]\right\}$$

$$P(\alpha, \sigma \mid r) \propto$$

$$P(\sigma_0^{(u)})\prod_{n=0}^{N-1} F_n(\alpha_n, \sigma_n)\prod_{u=1}^{U} H_n^{(u)}(\alpha_n^{(u)}, \sigma_n^{(u)}) \cdot I_n^{(u)}(\alpha_n^{(u)}, \sigma_n^{(u)}, \sigma_{n+1}^{(u)})P(\alpha_n^{(u)})$$

using the approximation $$F_n(\alpha_n, \sigma_n) \simeq \prod_{i=1}^{U-1} F_n^{(i,i+1)}(\alpha_n^{(i)}, \sigma_n^{(i)}, \alpha_n^{(i+1)}, \sigma_n^{(i+1)})$$

where $$F_n^{(i,i+1)}(\alpha_n^{(i)}, \sigma_n^{(i)}, \alpha_n^{(i+1)}, \sigma_n^{(i+1)}) = \exp\left\{-\frac{1}{N_0}\mathrm{Re}[s_n^{(i)H} s_n^{(i+1)}]\right\},$$

wherein P is a probability mass function of a time-sequence of states and transmitted symbols of all users, u is a user, n is a discrete time instant, $N_0$ is the power spectral density of the complex noise, $\alpha_n^{(u)}$ is the symbol transmitted by user u at the discrete time instant n, $\alpha_n = (\alpha_n^{(1)}, \ldots, \alpha_n^{(u)})^T$ is a vector of the symbols transmitted by all users at the discrete time instant n, and $\alpha = (\alpha_0^T, \ldots, \alpha_N^T)^T$, $\sigma_n^{(u)}$ is a the state transmitted by user u at the discrete time instant n, $\sigma_n = (\sigma_n^{(1)}, \ldots, \sigma_n^{(U)})^T$ is a vector the states transmitted by all users at the discrete time instant n and $\sigma = (\sigma_{T0}, \ldots, \sigma_N^T)_T$, $r_n^H$ is the Hermitian transpose of the vector of received samples in the n-th symbol interval and $r = (r_0^T, \ldots, r_N^T)^T$, and $s_n^{(u)}$ is a vector of the contribution of user u to the useful signal component in the n-th symbol interval.

18. The method of claim 16, the disregarding multiple access interference (MAI) from at least some of the other users comprising disregarding users other than adjacent frequency users.

19. The method of 17, the received FDM-CPM signal having frequency overlaps between adjacent users.

20. The method of claim 16, wherein the factorization also involves functions which combine transmitter state transition constraints and metrics relating to a likelihood of individual transitions.

21. A non-transitory storage medium storing a computer program product which when executed by a processor, causes the processor to carry out a method of producing a configuration for processors of a frequency division multiplexed, continuous phase modulation (FDM-CPM) multi-user detector, the method comprising the steps of:

determining a message flow for iteratively determining, from a received multi-user signal, marginal a-posteriori probability mass functions (pmf's) of a time-sequence of CPM states and transmitted symbols of all users, corresponding to a specific factorization of the joint a posteriori pmf of the transmitted symbols and CPM states, and wherein the factorisation involves a combined variable representing possible transmitted symbols and CPM states of each user for each symbol time interval, so as to make the iterative process convergent, and wherein the message flow has non-exponential complexity with respect to the number of users by making an approximation by disregarding multiple access interference (MAI) from at least some of the other users.

* * * * *